United States Patent
Kim et al.

(10) Patent No.: US 12,532,281 B2
(45) Date of Patent: Jan. 20, 2026

(54) METHOD AND APPARATUS FOR HANDLING SYNCHRONIZATION IN WIRELESS COMMUNICATION SYSTEM

(71) Applicant: LG Electronics Inc., Seoul (KR)

(72) Inventors: Hongsuk Kim, Seoul (KR); Sunghoon Jung, Seoul (KR); Hanul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 410 days.

(21) Appl. No.: 18/012,506

(22) PCT Filed: Aug. 6, 2021

(86) PCT No.: PCT/KR2021/010416
§ 371 (c)(1),
(2) Date: Dec. 22, 2022

(87) PCT Pub. No.: WO2022/031111
PCT Pub. Date: Feb. 10, 2022

(65) Prior Publication Data
US 2023/0262634 A1   Aug. 17, 2023

Related U.S. Application Data

(60) Provisional application No. 63/062,419, filed on Aug. 6, 2020.

(51) Int. Cl.
*H04W 56/00* (2009.01)
*H04W 76/27* (2018.01)

(52) U.S. Cl.
CPC ....... *H04W 56/0045* (2013.01); *H04W 76/27* (2018.02)

(58) Field of Classification Search
CPC . H04W 56/0045; H04W 76/27; H04W 76/15; H04W 52/0206; H04W 56/001;
(Continued)

(56) References Cited

U.S. PATENT DOCUMENTS

2020/0029316 A1   1/2020   Zhou et al.
2020/0092779 A1*  3/2020   Jung ............... H04W 76/27
(Continued)

FOREIGN PATENT DOCUMENTS

KR       20150128234        11/2015
WO   WO-2020028792 A1 *  2/2020   ......... H04L 41/0654

OTHER PUBLICATIONS

3GPP, "3rd Generation Partnership Project; Technical Specification Group Radio Access Network; NR; Medium Access Control (MAC) protocol specification (Release 16)," TS 38.321 V16.1.0, Jul. 2020, 151 pages.

(Continued)

*Primary Examiner* — Charles C Jiang
*Assistant Examiner* — Shawn D Miller
(74) *Attorney, Agent, or Firm* — Fish & Richardson P.C.

(57) ABSTRACT

A method performed by a wireless device includes: receiving configurations for a master cell group (MCG) and a secondary cell group (SCG); applying a first timing alignment (TA) for cells in the SCG and skipping physical downlink control channel (PDCCH) monitoring for the cells in a first state while a TA timer is running, wherein the TA timer is started upon receiving a TA command including the first TA; performing state switching to a second state at a time determined based on information related to state switching time received from a network, wherein PDCCH monitoring is performed for the cells in the second state; transmitting, to the network, switching information informing the state switching; and afterwards receiving, in the second state, a TA command including a second TA upon which the TA timer is restarted; and applying the second TA for the cells while the restarted TA timer is running.

13 Claims, 17 Drawing Sheets

(58) Field of Classification Search
CPC .. H04W 72/231; H04L 5/0096; H04L 5/0098; H04L 5/0053; H04L 5/001; Y02D 30/70
See application file for complete search history.

(56) References Cited

U.S. PATENT DOCUMENTS

| | | |
|---|---|---|
| 2020/0100179 A1 | 3/2020 | Zhou et al. |
| 2020/0106573 A1 | 4/2020 | Cirik et al. |
| 2021/0068164 A1* | 3/2021 | Sato ................. H04W 56/0045 |

OTHER PUBLICATIONS

3GPP, "3rd Generation Partnership Project; Technical Specification Group Radio Access Network; NR; Radio Resource Control (RRC) protocol specification (Release 16)," TS 38.331 V16.1.0, Jul. 2020, 906 pages.

Ericsson, "Updates for R16 LTE Mobility Enhancements and LTE updates for R16 NR Mobility Enhancements," R2-2005757 (Revision of R2-2004621), Presented at 3GPP TSG-RAN WG2 Meeting #110-e, Electronic meeting, Jun. 1-2, 2020, 1051 pages.

Huawei, "New WID on further enhancements on Multi-Radio Dual-Connectivity," RP-193249, Presented at 3GPP TSG RAN Meeting #86, Sitges, Spain, Dec. 9-12, 2019, 5 pages.

Qualcomm, "Dormant BWP for fast SCell activation," R2-1801432, Presented at 3GPP TSG-RAN WG2 Meeting NR Ad-Hoc #1, Vancouver, Canada, Jan. 22-26, 2018, 2 pages.

* cited by examiner

METHOD AND APPARATUS FOR HANDLING SYNCHRONIZATION IN WIRELESS COMMUNICATION SYSTEM

CROSS-REFERENCE TO RELATED APPLICATIONS

This application is a National Stage application under 35 U.S.C. § 371 of International Application No. PCT/KR2021/010416, filed on Aug. 6, 2021, which claims the benefit of U.S. Provisional Application No. 63/062,419, filed on Aug. 6, 2020. The disclosures of the prior applications are incorporated by reference in their entirety.

TECHNICAL FIELD

The present disclosure relates to handling a synchronization in wireless communications.

BACKGROUND generation partnership project (3GPP) long-term evolution (LTE) is a technology for enabling high-speed packet communications, Many schemes have been proposed for the LTE objective including those that aim to reduce user and provider costs, improve service quality, and expand and improve coverage and system capacity. The 3GPP LIE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems, 3GPP has to identify and develop the technology components needed for successfully standardizing the new RAT timely satisfying both the urgent market needs, and the more long-term requirements set forth by the ITU radio communication sector (ITU-R) international mobile telecommunications (IMI)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

To perform a communication in wireless communications, downlink and uplink synchronization may be guaranteed. For example, uplink synchronization may be maintained for a timing advance group (TAG) while a timing alignment (TA) timer is running. If the TA timer expires, uplink may be out of synchronization, and physical uplink control channel (PUCCH) may be released.

SUMMARY

An aspect of the present disclosure is to provide method and apparatus for handing a synchronization in a wireless communication system.

Another aspect of the present disclosure is to provide method and apparatus for handling a synchronization while in a dormant stale in a wireless communication system.

According to an embodiment of the present disclosure, a method performed by a wireless device in a wireless communication system comprises: receiving a configuration for a master cell group (MCG) and a configuration for a secondary cell group (SCG); applying a first timing alignment (TA) for one or more cells in the SCG and skipping a physical downlink control channel (PDCCH) monitoring for the one or more cells in a first state while a TA timer is running, wherein the TA tinier is started upon receiving a TA command including the first TA; performing a state switching to a second state from the first state at a time point determined based on information related to state switching time received from a network, Wherein a PDCCH monitoring is performed for the one or more cells in the second state; transmitting, to the network, switching information informing the state switching; receiving, in the second state, a TA command including a second TA upon which the TA timer is restarted, after transmitting the switching information; and applying the second TA for the one or more cells while the restarted TA timer is running.

According to an embodiment of the present disclosure, a wireless device in a wireless communication system comprises: a transceiver; a memory; and at least one processor operatively coupled to the transceiver and the memory, and configured to: control the transceiver to receive a configuration for a master cell group (MCG) and a configuration for a secondary cell group (SCG); apply a first timing alignment (TA) for one or more cells in the SCG and skipping a physical downlink control channel (PDCCH) monitoring for the one or more cells in a first state while a TA timer is running, wherein the TA timer is started upon receiving a TA command including the first TA; perform a state switching to a second state from the first state at a time point determined based on information related to state switching time received from a network, wherein a PDCCH monitoring is performed for the one or more cells in the second state; control the transceiver to transmit, to the network, switching information informing the state switching; control the transceiver to receive, in the second state, a TA command including a second TA upon which the TA timer is restarted, after transmitting the switching information; and apply the second TA for the one or more cells while the restarted TA timer is running.

According to an embodiment of the present disclosure, a non-transitory computer-readable medium has stored thereon a plurality of instructions. The plurality of instructions, when executed by a processor of a wireless device, cause the wireless device to: receive a configuration for a master cell group (MCG) and a configuration for a secondary cell group (SCG); apply a first timing alignment (TA) for one or more cells in the SCG and skipping a physical downlink control channel (PDCCH) monitoring for the one or more cells in a first state while a TA timer is running, wherein the TA timer is started upon receiving a TA command including the first TA; perform a slate switching to a second state from the first state at a time point determined based on information related to state switching time received from a network, Wherein a PDCCH monitoring is performed for the one or more cells in the second state; transmit, to the network, switching information informing the state switching; receive, in the second state, a TA command including a second TA upon which the TA timer is restarted, after transmitting the switching information; and apply the second TA for the one or more cells while the restarted TA timer is running.

According to an embodiment of the present disclosure, a processor for a wireless device in a wireless communication system executes instructions which are implemented by a software code stored in a memory of the wireless device.

The instructions perform operations comprising: receiving a configuration for a master cell group (MCG) and a configuration for a secondary cell group (SCG); applying a first timing alignment (TA) for one or more cells in the SCG and skipping a physical downlink control channel (PDCCH) monitoring for the one or more cells in a first state while a TA tinier is running, wherein the TA timer is started upon receiving a TA command including the first TA; performing a state switching to a second state from the first state at a time point determined based on information related to state switching time received from a network, wherein a PDCCH monitoring is performed for the one or more cells in the second state; transmitting, to the network, switching information informing the state switching; receiving, in the second state, a TA command including a second TA upon which the TA timer is restarted, after transmitting the switching information; and applying the second TA for the one or more cells while the restarted TA timer is running.

According, to an embodiment of the present disclosure, a method performed by a base station (BS) in a wireless communication system comprises: transmitting, to a wireless device, information related to state switching time used to determine a time point at which a state switching from a first state to a second state is performed while a timing alignment (TA) timer is running or upon an expiry of the TA timer; receiving, from the wireless device, switching information informing the state switching after the state switching is performed; transmitting, to the wireless device in the second state, downlink control information (DCI) assigning downlink resources via a physical downlink control channel (PDCCH) based on the switching information; and transmitting, to the wireless device in the second state, a TA command for restarting the TA timer based on the downlink resources, wherein a PDCCH monitoring is skipped for one or more cells in a secondary cell group (SCG) in the first state, and wherein a PDCCH monitoring is performed for the one or more cells in the second state.

According to an embodiment of the present disclosure, a base station (BS) in a wireless communication system comprises: a transceiver; a memory; and at least one processor operatively coupled to the transceiver and the memory, and configured to control the transceiver to: transmit, to a wireless device, information related to state switching time used to determine a time point at which a state switching from a first state to a second state is performed while a timing alignment (TA) timer is running or upon an expiry of the TA timer; receive, from the wireless device, switching information informing the state switching after the state switching is performed; transmit, to the wireless device in the second stale, downlink control information (DCI) assigning downlink resources via a physical downlink control channel (PDCCH) based on the switching information; and transmit, to the wireless device in the second state, a TA command for restarting the TA timer based on the downlink resources, wherein a PDCCH monitoring is skipped for one or more cells in a secondary cell group (SCG) in the first state, and wherein a PDCCH monitoring is performed for the one or more cells in the second state.

The present disclosure can have various advantageous effects.

For example, an unnecessary RRC signalling for a cell group activation/deactivation (e.g., SCG activation/deactivation) can be reduced and PDCCH release due to a TA expiry can be prevented while PSCell or PUCCH SCells are suspended in a dormant state.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
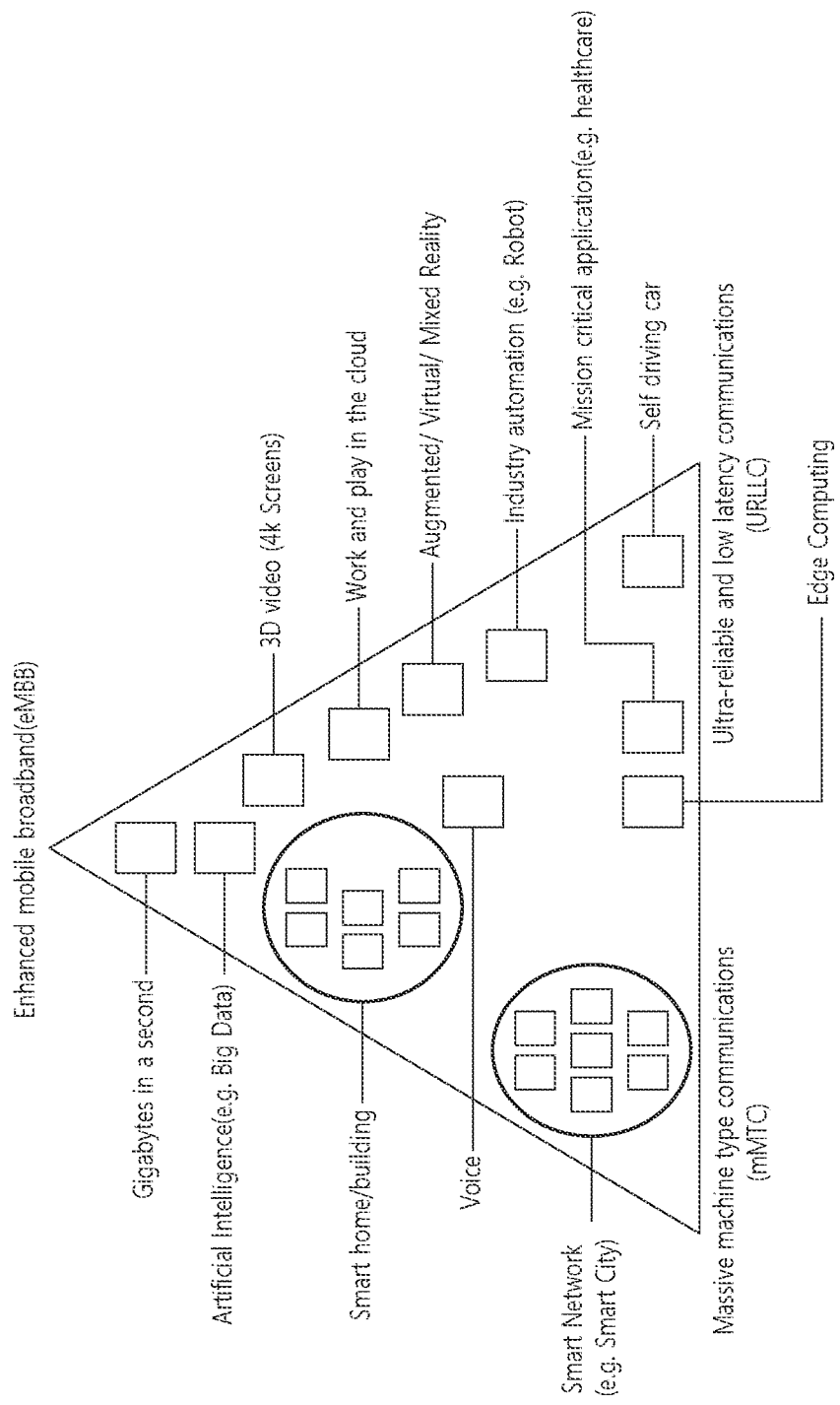
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LIE- A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A. B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information e, PDCCH)". "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state'. 'channel quality'. ' channel state/reference signal received power (RSRP)' and ' reference signal received quality (RSRQ)' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 50 plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (YR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory, and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
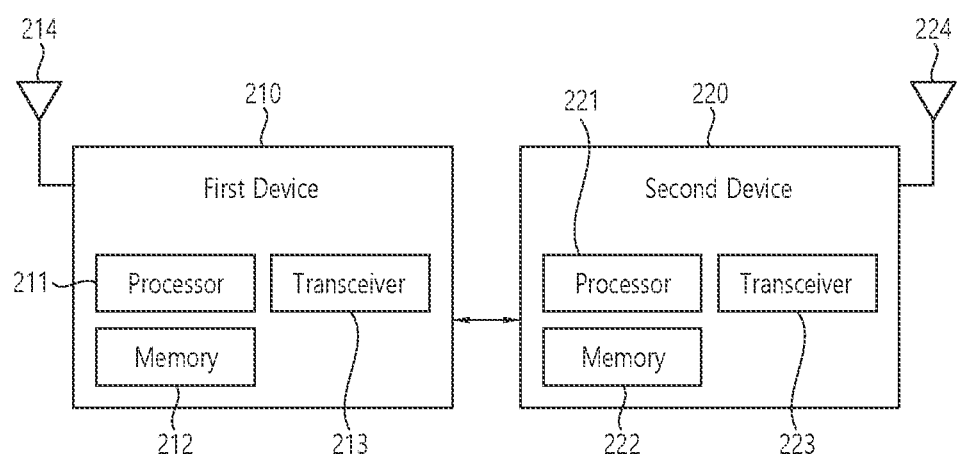
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, YR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
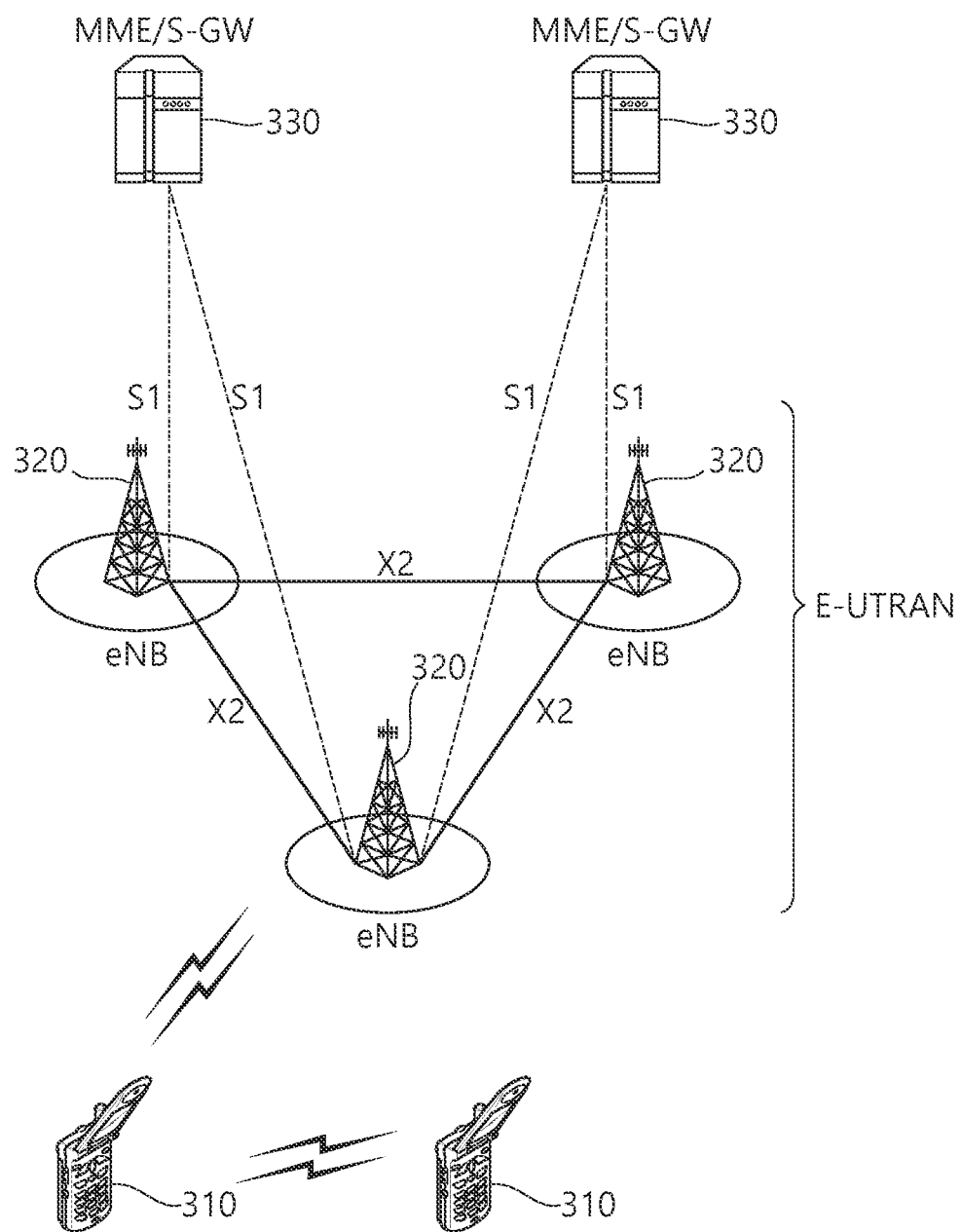
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The LIE 310 is connected to the eNB 320 by means of the Lin interface. The UEs 310 are interconnected with each other by means of the PCS interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
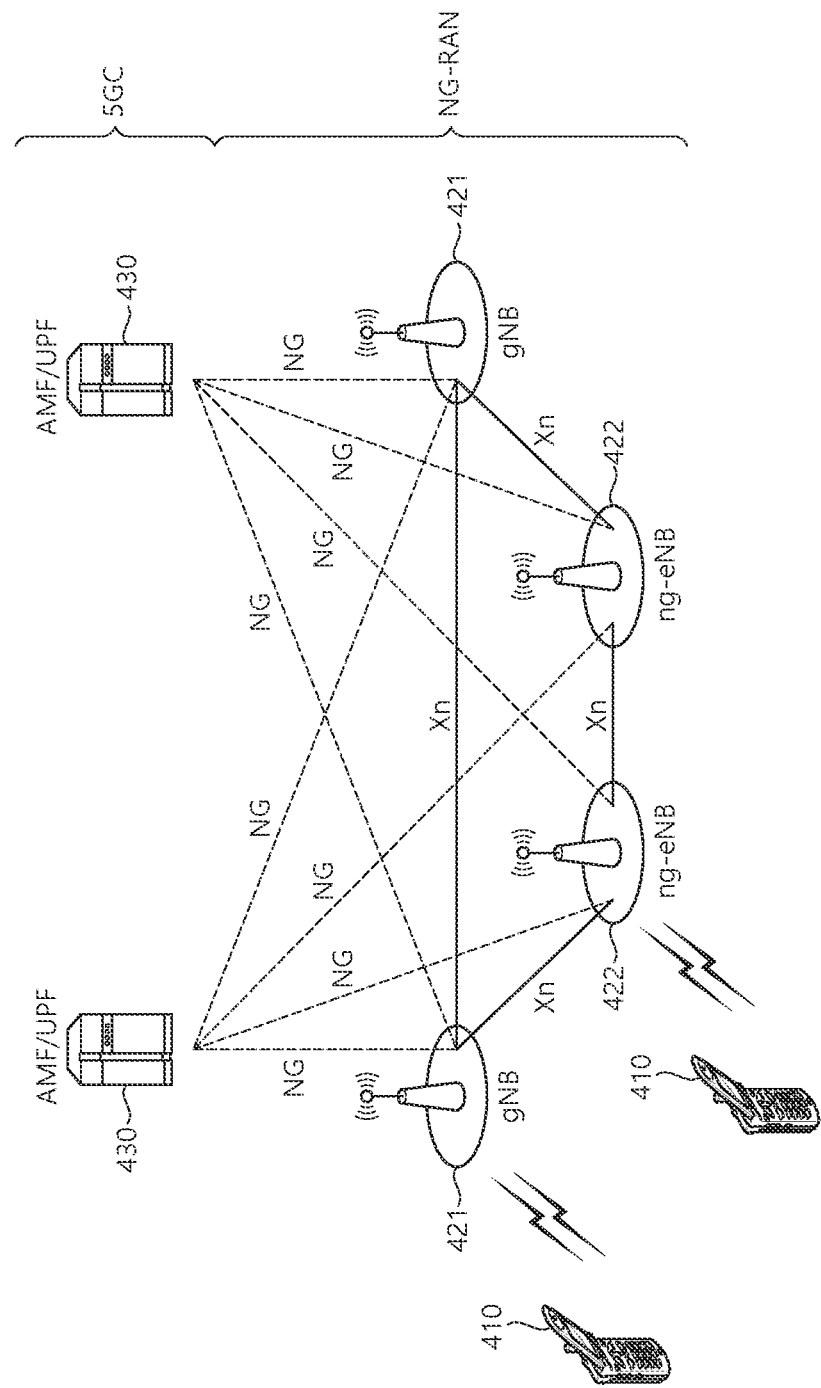
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NO-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF), The AMF hosts the functions, such as NAS security, idle state mobility handling, etc. The AMF is an entity including the functions of the conventional MME. The UPF hosts the functions, such as mobility anchoring, protocol data unit (PDU) handling. The UPI' an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NO interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
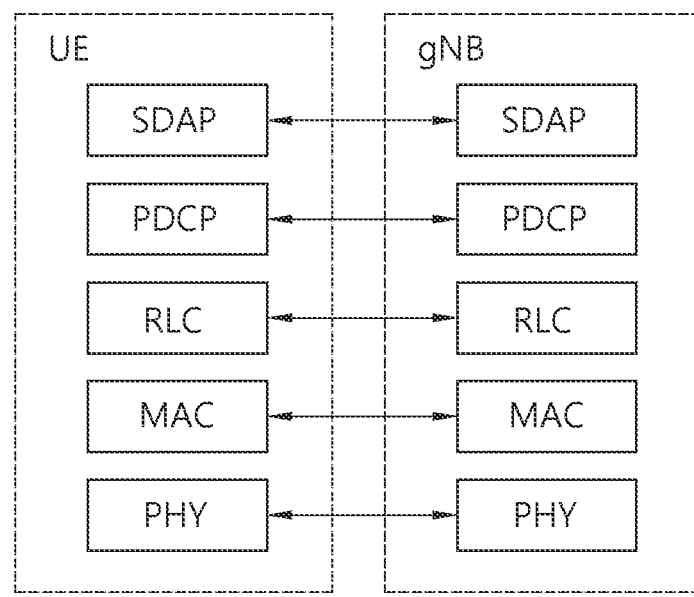
FIG. 5 shows a block diagram of a user plane protocol stack to which the technical features of the present disclosure can be applied.
Figure 6:
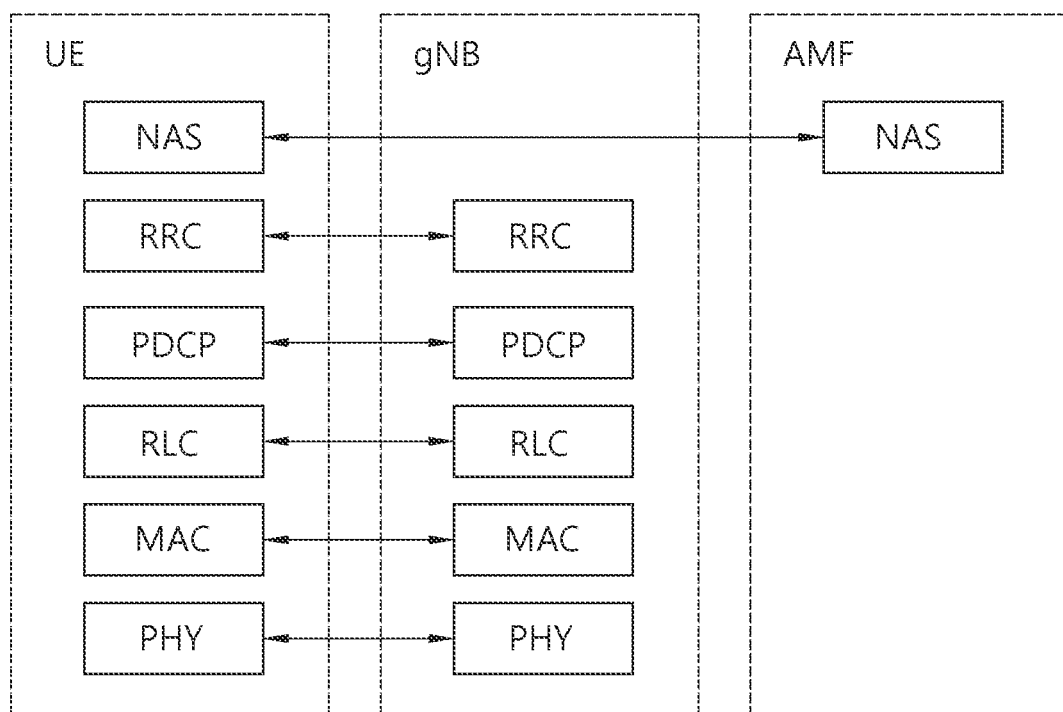
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PRY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data. PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RIX SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (IAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB), The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for LIE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC. INACTIVE. Meanwhile, in RRC_INACTIVE, 5GC-NO-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), common control channel (CCCH) and a dedicated control channel (DCCH). The BCCH is a DL, channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DI, BCCH can be mapped to BCH, BCCH can be mapped to DL-SCH, PCCH can be mapped to PCH, CCCH can be mapped to DL-SCFI, DCCH can be mapped to DL-SCFI, and DTCH can be mapped to DL-SCH. In UL, CCCH can be mapped to UL-SCFI, DCCH can be mapped to UL-SCH, and DTCH can be mapped to UL-SCH.

Figure 7:
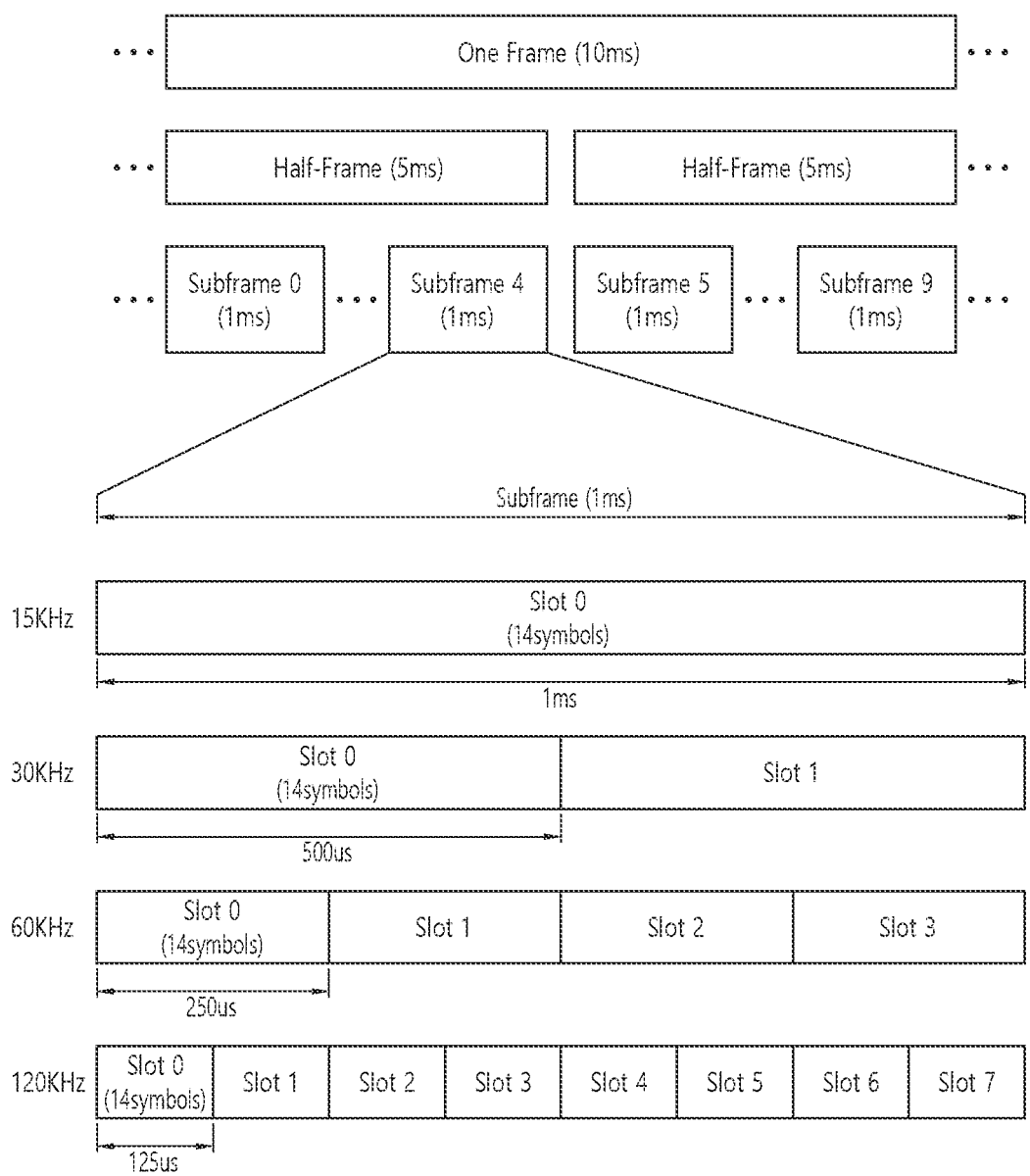
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. EaCh frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing βf=2 u*15 kHz. The following table shows the number of OFDM symbols per slot, the number of slots per frame, and the number of slots per for the normal CP, according to the subcarrier spacing βf=2 u*15 kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing βf=2 u*15 kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the timber of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE, Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one MVP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
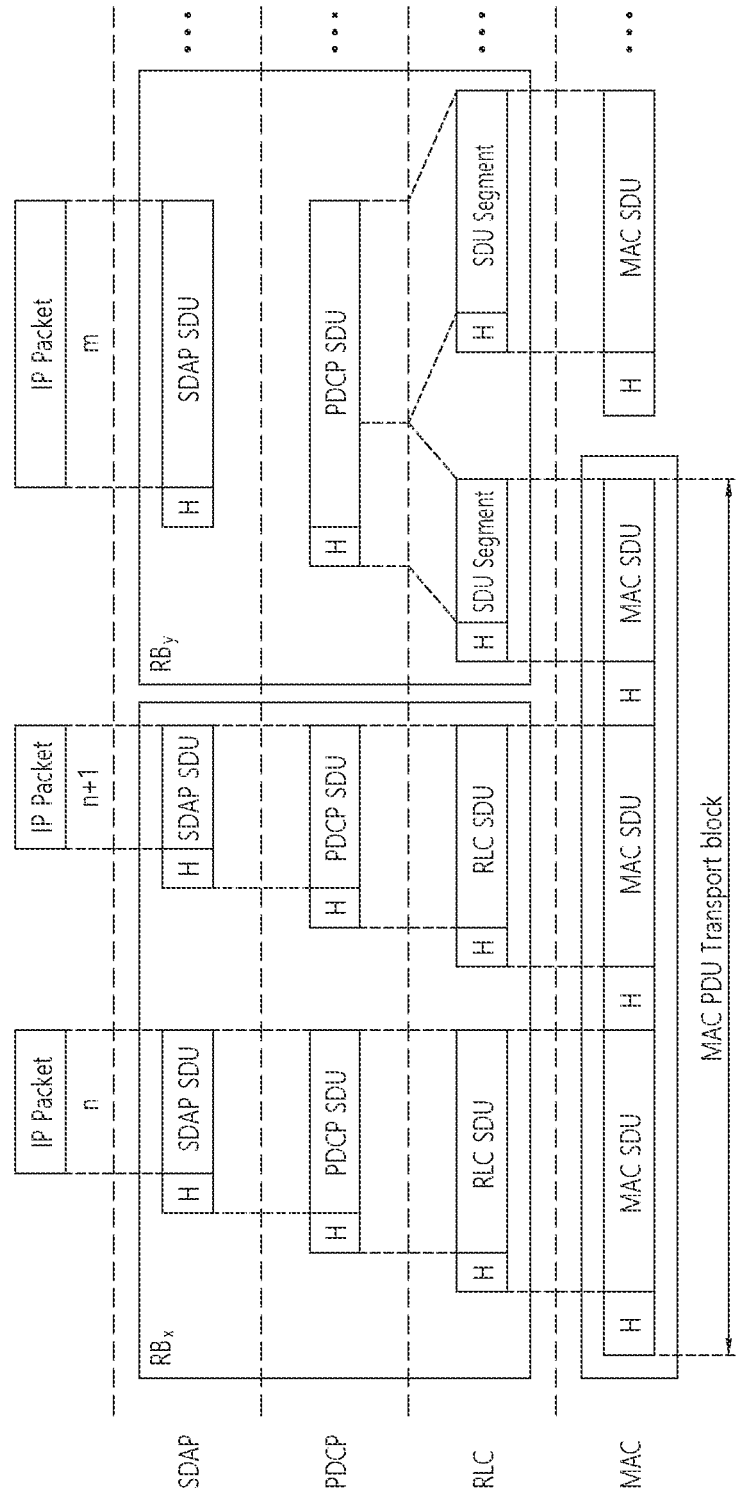
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted; received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Hereinafter, contents regarding a bandwidth part (BWP) is described.

BWP may be a contiguous set of physical resource blocks (PRBs), selected from a contiguous subset of the common resource blocks (CRBs) for a given numerology u on a given carrier.

Figure 9:
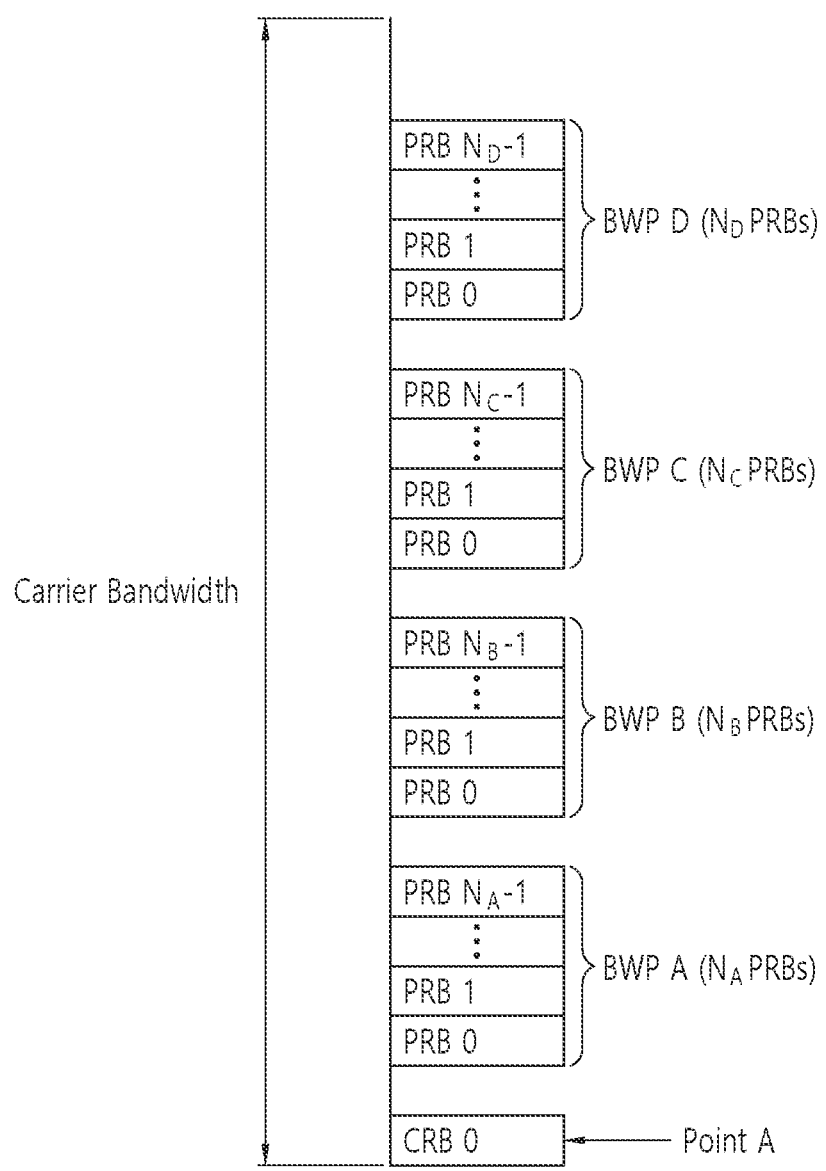
FIG. 9 shows an example of a BWP configuration to which technical features of the present disclosure is applied.

FIG. 9 shows an example of a BWP configuration to which technical features of the present disclosure is applied.

Referring to FIG. 9, 4 BWPs (i.e., BWP A, BWP B, BWP C and BWP D) are configured in a carrier bandwidth. The carrier bandwidth (or, carrier band) may comprise CRBs numbered from CRB0. CRB0 may correspond to or may be determined based on point A. Point A may indicate a common reference point for resource block grids and may be obtained from higher layer parameters.

The BWP A may comprise $N_A$ PRBs numbered from PRB0 to PRB $N_A-1$. The PRB0 in the BWP A may have the number of offset PRBs/CRBs with respect to the CRB0, which may or may not be configured from a network.

The BWP B may comprise $N_B$ PRBs numbered from PRB0 to PRB $N_B-1$. The PRB0 in the BWP B may have the number of offset PRBs/CRBs with respect to the CRB0, which may or may not configured from a network.

The BWP C may comprise $N_C$ PRBs numbered from PRB0 to PRB $N_C-1$. The PRB0 in the BWP C may have the number of offset PRBs/CRBs with respect to the CRB0, which may or may not configured from a network.

The BWP D may comprise $N_D$ PRBs numbered from PRB0 to PRB $N_D-1$. The PRB0 in the BWP D may have the number of offset PRBs/CRBs with respect to the CRB0, which may or may not configured from a network.

There may be various types of MVPs, such as initial BWP, first active BWP, default MVPs, and/or regular BWPs.

Initial BWP may be used for initial access (e.g., DL synchronization procedure, random access procedure) before RRC connection is established.

First active BWP may be a BWP to be active right after the initial attach is completed.

Default BWP may be a BWP to which UE and/or network automatically switches when there is no activity in current BWP while BWP inactivity timer is running. The BWP inactivity timer may indicate a duration after which the UE falls back to the default BWP.

In downlink, a UE can be configured with up to four carrier BWPs. The bandwidth of each BWP should be equal or greater than synchronization signal (SS) Block bandwidth (BW), but each BW may or may not contain SS Block, Only one carrier BWP can be active at a given time. The LT may not be expected to receive PDCCH, PDCCH, CSI-RS, and/or TRS outside an active bandwidth part. Each DL BWP may include at least one CORESET with UE Specific Search Space (USS). In primary carrier, at least one of the configured DL BWPs may include one CORESET with common search space (CSS).

In uplink, a UE can be configured with up to four carrier bandwidth parts. Only one carrier bandwidth part can be active at a given time. If a UE is configured with a supplementary uplink, the UE can in addition be configured with up to four carrier bandwidth parts in the supplementary uplink, and/or only one carrier bandwidth part can be active at a given time. The UE shall not transmit PUSCH or PDCCH outside an active bandwidth part.

In an initial access procedure, the initial BWP may be an active MVP. The initial BWP may be configured via RRC Right after the initial attach is completed, the first active BWP may be an active BWP. The first active BWP may be configured via RRC A specific BWP can be activated by BWP indicator in DCI. When a UE receives the DCI including the BWP indicator while the UE is on the first active MVP or other active BWP, the active BWP may be switched to the specific BWP indicated by the BWP indicator.

If a BWP inactivity timer expires, the default BWP may be an active BWP.

Further, in the disclosure, a dormant BWP may be defined. The dormant BWP is one of downlink BWPs configured by the network via dedicated RRC signalling. In the dormant BWP, the UF, may stop monitoring PDCCH on/for the SCell, but continue performing CSI measurements, automatic gain control (AGC) and/or beam management, if configured. That is, in the dormant MP, no uplink or downlink grant is allowed, but periodic CSI reporting can continue. For each serving cell other than the SpCell or PUCCH SCell, the network may configure one BWP as a dormant BWP.

Figure 10:
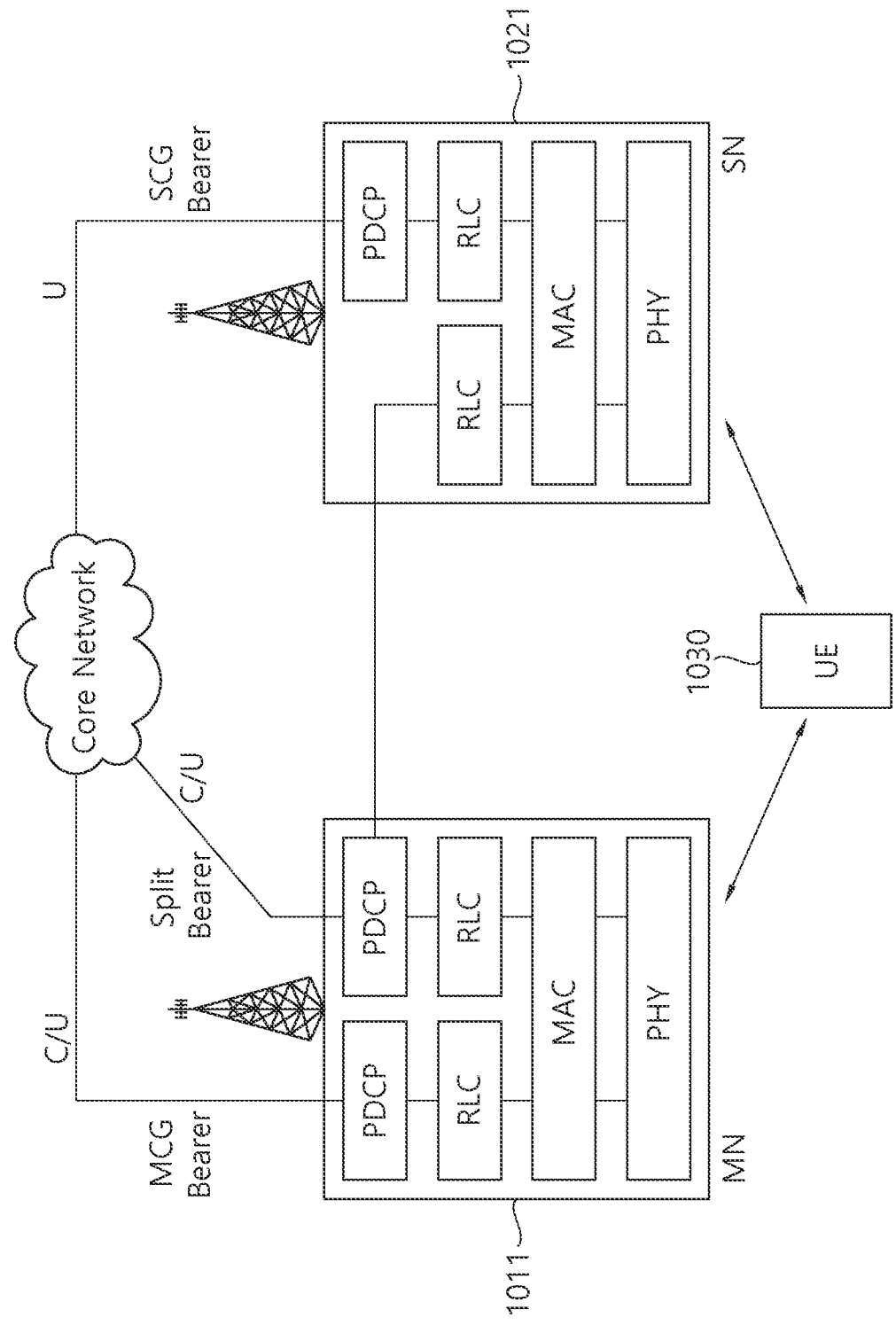
FIG. 10 shows an example of a dual connectivity (DC) architecture to which technical features of the present disclosure can be applied.

FIG. 10 shows an example of a dual connectivity (DC) architecture to which technical features of the present disclosure can be applied.

Referring to FIG. 10, MN 1011, SN 1021, and a UE 1030 communicating with both the MN 1011 and the SN 1021 are illustrated. As illustrated in FIG. 10, DC refers to a scheme in which a UE (e.g., UE 1030) utilizes radio resources provided by at least two RAN nodes comprising a MN (e.g., MN 1011) and one or more SNs (e.g., SN 1021). In other words, DC refers to a scheme in which a UE is connected to both the MN and the one or more SNs, and communicates with both the MN and the one or more SNs. Since the MN and the SN may be in different sites, a backhaul between the MN and the SN may be construed as non-ideal backhaul (e.g., relatively large delay between nodes).

MN (e.g., MN 1011) refers to a main RAN node providing services to a UE in DC situation. SN (e.g., SN 1021) refers to an additional RAN node providing services to the UE with the MN in the DC situation. If one RAN node provides services to a UE, the RAN node may be a MN. SN can exist if MN exists.

For example, the MN may be associated with macro cell whose coverage is relatively larger than that of a small cell. However, the MN does not have to be associated with macro cell—that is, the MN may be associated with a small cell. Throughout the disclosure, a RAN node that is associated with a macro cell may be referred to as 'macro cell node'. MN may comprise macro cell node.

For example, the SN may be associated with small cell (e.g., micro cell, pico cell, femto cell) whose coverage is relatively smaller than that of a macro cell. However, the SN does not have to be associated with small cell—that is, the SN may be associated with a macro cell, Throughout the disclosure, a RAN node that is associated with a small cell may be referred to as 'small cell node'. SN may comprise small cell node.

The MN may be associated with a master cell group (MCG). MCG may refer to a group of serving cells associated with the MN, and may comprise a primary cell (PCell) and optionally one or more secondary cells (SCells). User plane data and/or control plane data may be transported from a core network to the MN through a MCG bearer, MCG bearer refers to a bearer whose radio protocols are located in the MN to use MN resources. As shown in FIG. 10, the radio protocols of the MCG bearer may comprise PDCP, RLC, MAC and/or PHY.

The SN may be associated with a secondary cell group (SCG). SCG may refer to a group of serving cells associated with the SN, and may comprise a primary secondary cell (PSCell) and optionally one or more SCells. User plane data may be transported from a core network to the SN through a SCG bearer. SCG bearer refers to a bearer whose radio protocols are located in the SN to use SN resources. As shown in FIG. 10, the radio protocols of the SCG bearer may comprise PDCP. RLC, MAC and PHY.

User plane data and/or control plane data may be transported from a core network to the MN and split up/duplicated in the MN, and at least part of the split/duplicated data may be forwarded to the SN through a split bearer. Split bearer refers to a bearer whose radio protocols are located in both the MN and the SN to use both MN resources and SN resources. As shown in FIG. 10, the radio protocols of the split bearer located in the MN may comprise PDCP, RLC, MAC and PHY. The radio protocols of the split bearer located in the SN may comprise RLC, MAC and PHY.

According to various embodiments, PDCP anchor/PDCP anchor point/PDCP anchor node refers to a RAN node comprising a PDCP entity which splits up and/or duplicates data and forwards at least part of the split/duplicated data over X2/Xn interface to another RAN node. In the example of FIG. 10, PDCP anchor node may be MN.

According to various embodiments, the MN for the UE may be changed. This may be referred to as handover, or a MN handover.

According to various embodiments, a SN may newly start providing radio resources to the UE, establishing a connection with the UE, and/or communicating with the UE (i.e., SN for the UE may be newly added). This may be referred to as a SN addition.

According to various embodiments, a SN for the UE may be changed while the MN for the UE is maintained. This may be referred to as a SN change.

According to various embodiments, DC may comprise E-UTRAN NR-DC (EN-DC), and/or multi-radio access technology (RAT)-DC (MR-DC). EN-DC refers to a DC situation in which a UE utilizes radio resources provided by E-UTRAN node and NR RAN node. MR-DC refers to a DC situation in which a UE utilizes radio resources provided by RAN nodes with different RATs.

A UE may receive a cell group configuration from a network which configures one or more cell groups (e.g., MCG and/or SCG). The cell group configuration may comprise a dormant BWP configuration for a non-PUCCH The dormant BWP configuration may comprise one or more of the following parameters:
- dormancyGroupWithinActiveTime: contains the ID of an SCell group for Dormancy within active time, to which this SCell belongs.
- dormancyGroupOutsideActiveTime: contains the ID of an SCell group for Dormancy outside active time, to which this SCell belongs.
- dormantBWP-Id: contains the ID of the downlink bandwidth part to be used as dormant BWP. The dormant BWP may be different from the default DL BWP. If dormantBWP-Id is configured, at least one of the withinActiveTimeConfig and outsideActiveTimeConfig should be configured.

firstOutsideActiveTimeBWP-Id: contains the ID of the downlink bandwidth part to be activated when receiving a DCI indication for SCell dormancy outside active time.

firstWithinActiveTimeBWP-Id: contains the ID of the downlink bandwidth activated when receiving a DCI indication for SCell dormancy within active time.

outsideActiveTimeConfig: contains the configuration to be used for SCell dormancy outside active time. The outsideActiveTimeConfig can only be present when the cell group the SCell belongs to is configured with dcp-Confi.

withinActiveTimeConfig: contains the configuration to be used for SCell dormancy within active time.

Hereinafter, contents regarding timing alignment/time alignment/timing advance/time advance (TA) is described.

RRC may configure TA timer per a timing advance group (TAG) for the maintenance of UL time alignment. The TA tinier may control how long the MAC entity considers the serving cells belonging to the associated TAG to be uplink time aligned.

The MAC entity shall, when a timing advance command MAC CE is received, apply the timing advance command for the indicated TAG, and start or restart the TA timer associated with the indicated TAG.

When the TA timer expires, the MAC entity shall notify RRC to release PUCCH for one or more of all the serving cells if configured, and notify RRC to release SRS for one or more of all the serving cells if configured.

When the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity may consider the TA timer associated with the SCell as expired.

The MAC entity shall not perform any uplink transmissions on a serving cell except the random access preamble and/or MSGA transmission when the TA timer associated with the TAG to which the serving cell belongs is not running. Furthermore, when the TA timer associated with a primary TAG (PTAG) is not running, the MAC entity shall not perform any uplink transmissions on any serving cell except the random access preamble and or MSGA transmission on the SpCell.

For fast SCG activation/deactivation, there may be a need for a PSCell to be suspended. Through SCG suspension, UE can simply reuse the previously applied SCG configuration and the UE can make time-efficient SCG activation by reducing a time for SCG (re)configuration. Methods for SCG suspension may comprise one or more of the following options (1) to (3):

(1) Transferring to dormant PSCell like dormant SCell.
(2) Deactivating SCG configuration but maintaining SCG configuration as a current SCG.
(3) Releasing SCG configuration but maintaining the SCG configuration as a stored SCG.

The option (1) will work very similarly to the dormant SCell mechanism, i.e., the UE doesn't monitor PDCCH and perform the CQI reporting only to the network in the dormant state. It doesn't require time for applying the configuration, time for synchronising i.e. RACH procedure, and time for activation by CQI reporting.

The option (2) will be more suitable for stationary UEs because, the UE doesn't monitor PDCCH and, in most cases, doesn't require CQI reporting to the network for SCG activation. The option (2) doesn't require time for applying the configuration, time for synchronising i.e. RACH procedure but the UE may require time for activating the SCG by CQI reporting in some scenarios. Thus, option (2) may be beneficial for UE power consumption by not performing even CQI reporting to the network.

Option (3) will be useful if multiple SCG configurations are supported, because the SCG can be changed frequently especially in the FR2 scenario, and reusing stored SCG configuration can help to reduce signalling overhead. However, option (3) may not reduce the time for SCG activation.

As stated above, all options may not require PDCCH monitoring, and the option (1) may be the most promising way of SCG suspension from the activation time perspective. The option (2) may have similar benefits from the same perspective but the option (2) may not be suitable for a non-stationary UE. The option (3) may be improper in terms of time-efficient SCG activation; especially due to the time for RACH procedure which requires the longest time in the SCG activation procedure.

Moreover, whether the UE, always keep synchronisation with the PSCell during SCG suspension may need to be considered. For example, if the UE cannot maintain UL synchronisation due to TA expiry at some moment, option (1) or option (2) may also require the RACH procedure for UL transmission timing and therefore option (1) or option (2) cannot reduce the time for synchronising like option (3). This is because the UE doesn't monitor PDCCH and the UE doesn't receive TA command MAC CE so that the TA timer cannot restart. This is a problem because the SCG activation/deactivation mechanism cannot be supported by TA expiry even though the radio quality of the PSCell is still good to stay. Therefore, for supporting SCG suspension, this problem should be solved for supporting time-efficient SCG activation while the radio quality of the PSCell is good even after TA expiry.

In the present disclosure, to reduce an unnecessary RRC signalling for a cell group activation, e.g. SCG activation, including releasing PDCCH due to the TA expiry, the UE autonomously may switch an active BWP from a dormant BWP Where the UE stops monitoring PDCCH on/for the serving cell, to one of other BWPs, i.e., non-dormant BWP, where PDCCH can be monitored before TA expiry based on PDCCH configuration. To switch BWP autonomously, the network may provide information for TA (time alignment) to UE and the information may be offset value and/or timer value related to TA.

For example, if the information for TA comprises an offset value, the UE may apply the offset value to a TA timer, i.e. timeAlignmentTimer, and the UE may switch to other BWP as early as the offset value before the expiry of TA.

For another example, if the information for TA comprises a new timer value (i.e., switching timer value), the UE may start the new timer value immediately after receiving the information fir TA. The UE may switch to other BWP upon expiry of the new timer.

Figure 11:
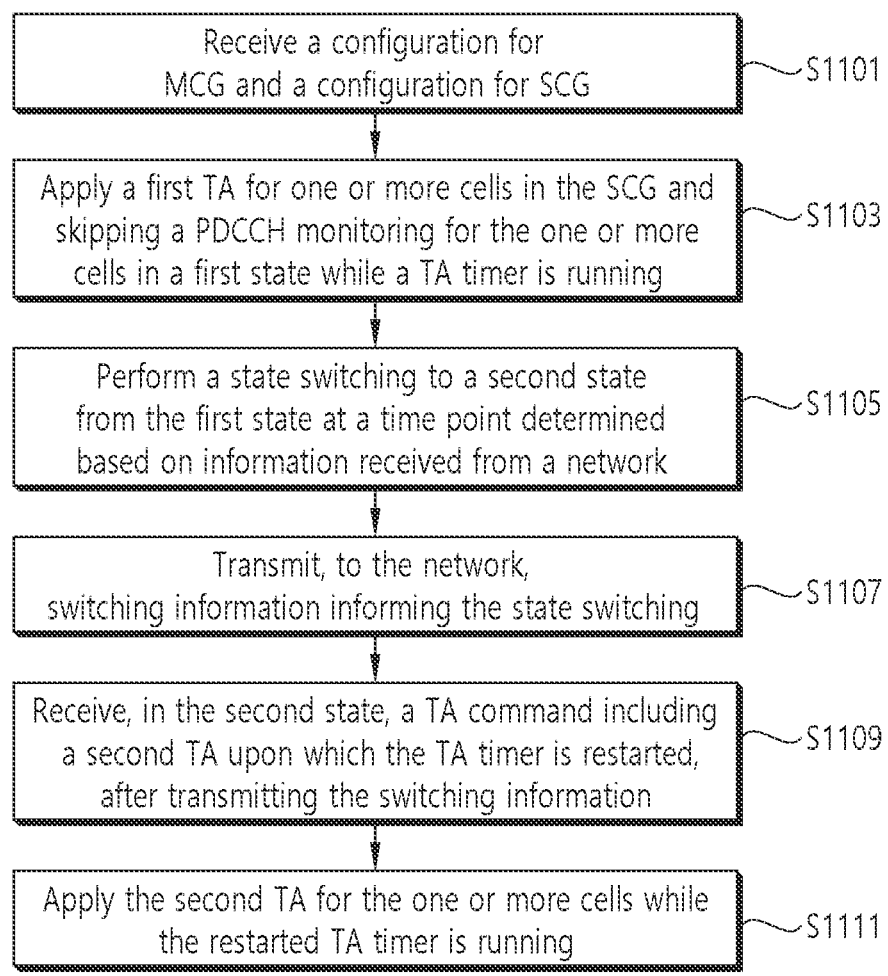
FIG. 11 shows an example of a method for maintaining a TA in SCG suspension according to an embodiment of the present disclosure.

FIG. 11 shows an example of a method for maintaining a TA in SCG suspension according to an embodiment of the present disclosure. Steps illustrated in FIG. 11 may be performed by a wireless device and/or a UE.

Referring to FIG. 11, in step S1101, the wireless device may receive a configuration for MCG and a configuration for SCG.

In step S1103, the wireless device may apply a first TA for one or more cells in the SCG and skipping a PDCCH monitoring for the one or more cells in a first state while a TA timer is running. The TA timer may be started upon receiving a TA command including the first TA.

In step S1105, the wireless device may perform a state switching to a second state from the first state at a time point determined based on information received from a network. In the second state, a PDCCH monitoring is performed for the one or more cells may be performed. Therefore, the second state may be referred to as a dormant state.

In step S1107, the wireless device may transmit, to the network, switching information informing the state switching.

In step S1109, the wireless device may receive, in the second state, a TA command including a second TA upon which the TA timer is restarted, after transmitting the switching information.

In step S1111, the wireless device may apply the second TA for the one or more cells while the restarted TA timer is running.

According to various embodiments, the one or more cells in the SCG may comprise at least one of a primary secondary cell (PSCell) or a physical uplink control channel (PDCCH) secondary cell (SCell).

According to various embodiments, the SCG may be deactivated for the one or more cells in the first state. The SCG may be activated for the one or more cells in the second state.

According to various embodiments, a periodic channel status information (CSI) reporting may be skipped in the first state. A periodic CSI reporting may be performed in the second state.

According to various embodiments, the wireless device may stay on a dormant bandwidth part (BWP) for the one or more cells in which a PDCCH monitoring is skipped for the one or more cells in the first state. The wireless device may stay on a PDCCH-configured BWP for the one or more cells in which a PDCCH monitoring is performed for the one or more cells in the second state.

According to various embodiments, the wireless device may receive, from the network, a dormant BWP configuration comprising information informing the dormant BWP.

According to various embodiments, the dormant BWP may comprise at least one of: a MVP informed by a BWP indicator in downlink control information (DCI) received from the network; a default BWP to be switched to upon an expiry of a BWP inactivity timer; a BWP configured to the wireless device via an RRC signalling from the network; or a BWP determined by a media access control (MAC) entity upon an initiation of a random access procedure.

According to various embodiments, the PDCCH-configured BWP may comprise at least one of: an initial BWP used for initial access before radio resource control (RRC) connection is established; a default BWP to be switched to upon an expiry of a BWP inactivity timer; a BWP selected by the wireless device; or a predetermined BWP configured to the wireless device via an RRC signalling from the network.

According, to various embodiments, the information related to state switching time may comprise an offset value which is non-negative value. The time point may be determined as an expiry time of the TA tinier minus the offset value.

According to various embodiments, the information related to state switching time may comprise information for a switching timer value. A switching timer may be started to run during the switching timer value upon receiving the information related to state switching time. The time point may be an expiry time of the switching timer.

According to various embodiments, the time point may be before an expiry time of the TA timer or equal to the expiry time of the TA timer.

According to various embodiments, after restarting the TA timer and applying the second TA for the one or more cells, the wireless device may perform a state switching to the first state from the second state.

According to various embodiments, the wireless device may receive a configuration related to a carrier aggregation (CA) and/or dual connectivity (DC). The wireless device may apply the configuration related to the CA and/or the DC. The wireless device may receive a configuration related to multiple states and additional information related to time alignment with a serving cell. The additional information related to time alignment may be one of an offset value related to a time alignment timer or timer value. The wireless device may activate a first state, among the multiple states, in which the UE stops PDCCH monitoring. The wireless device may check whether the UE needs to adjust the time alignment with the serving cell. The wireless device may switch autonomously from the first state to a second state, among the multiple states, in which the UE starts PDCCH monitoring based on the additional information related to the time alignment with the serving cell before expiry of the time alignment timer.

Hereinafter, details of the present disclosure is described.

Figure 12:
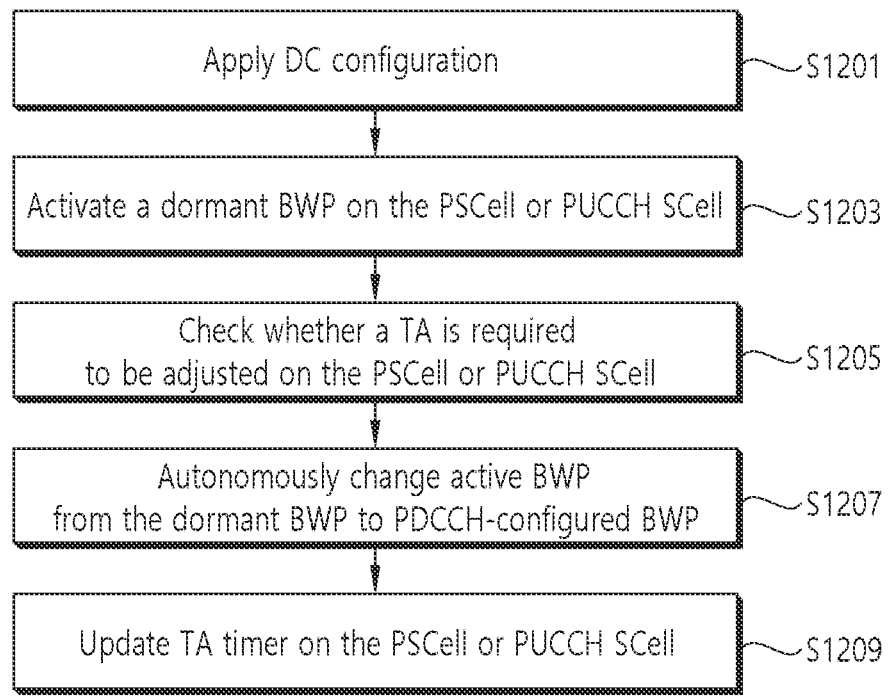
FIG. 12 shows an example of a method for handling a UL synchronization during SCG suspension according to an embodiment of the present disclosure.

FIG. 12 shows an example of a method for handling a UL synchronization during SCG suspension according to an embodiment of the present disclosure. Steps illustrated in FIG. 12 may performed by a wireless device and/or a UE.

Referring to FIG. 12, in step S1201, the UE may apply DC configuration. The UE may receive a DC configuration via an RRC dedicated signalling. The UE may apply MCG and SCG configuration and may be synchronised with serving cells including PSCell and/or PUCCH SCells.

In step S1203, the UE may activate a dormant BWP on the PSCell or PUCCH SCell. The UE may receive a dormant BWP configuration via RRC dedicated signalling to activate a dormant BWP on/for the PSCell or PUCCH SCells. In the dormant BWP for a cell, there is no PDCCH to monitor for the corresponding cell. The dormant BWP may comprise at least one BWP among configured multiple BWPs (e.g., maximum of four BWPs). The dormant BWP may be activated i) by the BWP switching, which is controlled by the PDCCH indicating a downlink assignment or an uplink grant, ii) by the bwp-InactivityTimer, iii) by RRC signalling, or iv) by the MAC entity itself upon initiation of random access procedure. Upon activation of the dormant BWP for a cell, the UE does not need to monitor PDCCH for the corresponding cell in the dormant BWP.

In step S1205, the UE may check whether a TA is required to be adjusted on the PSCell or PUCCH SCell. The UE may receive information for TA adjustment (or, information for TA, information related to state switching time) via an RRC dedicated signalling. The information for TA adjustment may be included together with the dormant BWP configuration. The information for TA adjustment may be included in the dormant BWP configuration. The information for TA adjustment may comprise an offset value and/or a new timer value (i.e., switching timer value) related to TA for the PSCell or the PUCCH SCell. If the information for TA adjustment comprises an offset value, the UE may apply the offset value to a TA timer. If the information for TA adjustment comprises a new timer value, the UE may start the new timer value immediately after receiving the information for TA adjustment.

In step S1207, the UE may autonomously change active BWP from the dormant BWP to PDCCH-configured BWP. If the information for TA adjustment comprises the offset value, the UE may autonomously switch active BWP from the dormant BWP to the PDCCH-configured BWP as early as the offset value before the expiry of TA. If the information for TA adjustment comprises the new timer value, the UE may autonomously switch active BWP from the dormant BWP to the PDCCH-configured BWP upon expiry of the new timer. This means that the UE deactivates the dormant BWP i.e. the BWP that is not configured with PDCCH, and activates the PDCCH-configured BWP, which is a BWP configured with PDCCH.

The PDDCH-configured BWP to be activated, i.e., to be switched from the dormant BWP, can be selected as follows:
- The PDCCH-configured. BWP may be the initial bandwidth part. In this case, the UE may change the active bandwidth part of the certain cell from the dormant BWP to the initial bandwidth part. The initial bandwidth part may be a bandwidth part used for initial access. The initial bandwidth part may be detected from system information. The initial bandwidth part may be referred to as BWP with BWP-Id=0.
- The PDCCH-configured BWP may be the default bandwidth part. In this case, the UE may change the active bandwidth part of the certain cell from the dormant BWP to the default bandwidth part. The default bandwidth part may be a bandwidth part to be used upon the expiry of the BWP inactivity timer. The UE may use the initial bandwidth part as the default bandwidth part.
- The UE may select a bandwidth part among bandwidth parts configured with PDCCH, and change the active bandwidth part from the dormant BWP to the selected bandwidth part.
- The network may predefine a bandwidth part having PDCCH. In this case, the UE may change the active bandwidth part from the dormant BWP to the predefined bandwidth part.

After MVP switching or upon BWP switching, the UE may indicate to acquire TA adjustment information by uplink signalling. The UE may indicate to the network for the autonomous BWP switching by random access procedure. If there is pre-configured information to indicate which network resources can be used for UE autonomous BWP switching, the UE may indicate to the network for the autonomous BWP switching by the pre-configured information. Otherwise, the UE may acquire another information to indicate which network resources can be used for UE autonomous BWP switching during random access procedure, then, the UE may indicate to the network for the autonomous BWP switching by the another information received by the random access procedure.

In step S1209, the wireless device may update TA timer on the PSCell or PUCCH SCell. Using the switched BWP, the UE may receive TA command MAC CE and restart TA timer. After restarting TA timer, the UE may also autonomously switch BWP again to the previous dormant MVP.

Figure 13:
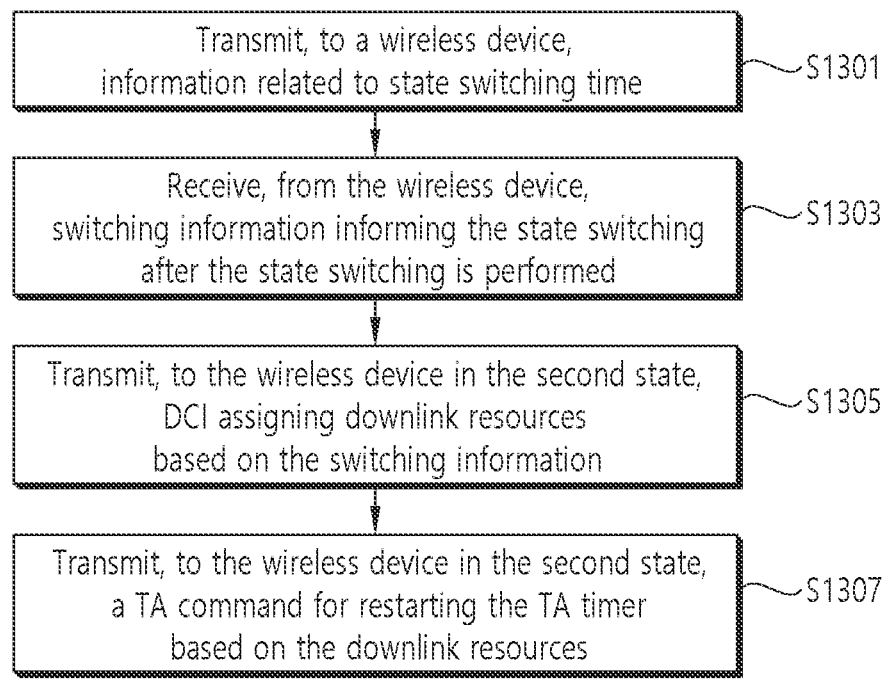
FIG. 13 shows an example of a method for providing a TA command to restart TA timer according to an embodiment of the present disclosure.

FIG. 13 shows an example of a method for providing a TA command to restart TA timer according to an embodiment of the present disclosure. Steps illustrated in FIG. 13 may be performed by a base station (BS).

Referring to FIG. 13, in step S1301, the BS may transmit, to a wireless device, information related to state switching time. The information related to state switching time may be used to determine a time point at which a state switching from a first state to a second state is performed while a TA timer is running or upon an expiry of the TA timer. A PDCCH monitoring may be skipped for one or more cells in an SCG in the first state. A PDCCH monitoring may be performed for the one or more cells in the second state.

In step S1303, the BS may receive, from the wireless device, switching information informing the state switching after the state switching is performed.

In step S1305, the BS may transmit, to the wireless device in the second state, DCI assigning downlink resources via a PDCCH based on the switching information.

In step S1307, the BS may transmit, to the wireless device in the second state, a TA command for restarting the TA timer based on the downlink resources.

The BS in FIG. 13 may be an example of a second device 220 in FIG. 2, and therefore, steps of the BS as illustrated in FIG. 13 may be implemented by the second device 220. For example, the processor 221 may be configured to control the transceiver 223 to transmit, to a wireless device, information related to state switching time. The information related to state switching time may be used to determine a time point at which a state switching from a first state to a second state is performed while a TA timer is running or upon an expiry of the TA timer. A PDCCH monitoring may be skipped for one or more cells in an SCG in the first state. A PDCCH monitoring may be performed for the one or more cells in the second state. The processor 221 may be configured to control the transceiver 223 to receive, from the wireless device, switching information informing the state switching after the state switching is performed. The processor 221 may be configured to control the transceiver 223 to transmit, to the wireless device in the second state, DCI assigning downlink resources via a PDCCH based on the switching information. The processor 221 may be configured to control the transceiver 223 to transmit, to the wireless device in the second state, a TA command for restarting the TA timer based on the downlink resources.

Figure 14:
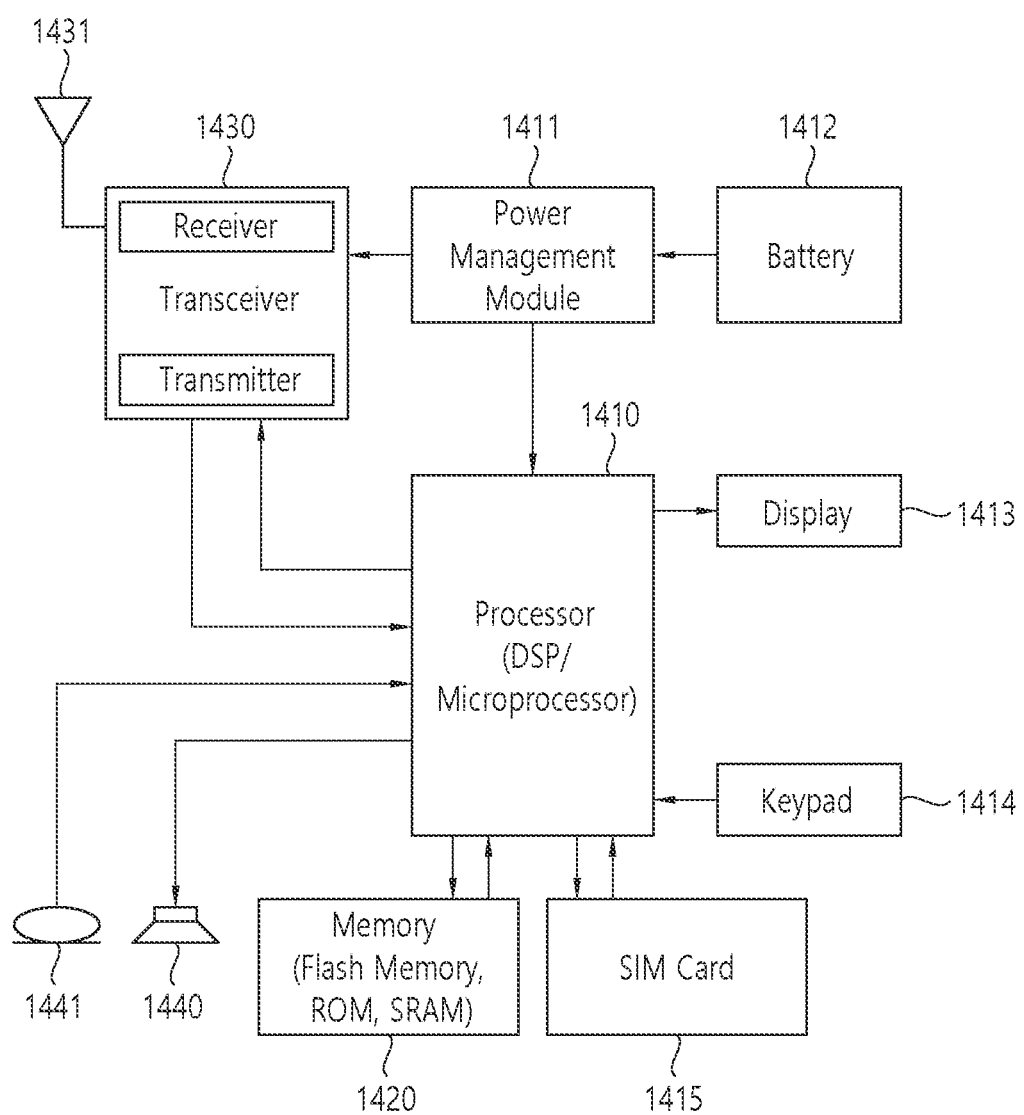
FIG. 14 shows a UE to implement an embodiment of the present disclosure.

FIG. 14 shows a UE to implement an embodiment of the present disclosure. The present disclosure described above for UE side may be applied to this embodiment. The UE in FIG. 14 may be an example of first device 214 as illustrated in FIG. 2.

A UE includes a processor 1410 (i.e., processor 211), a power management module 1411, a battery 1412, a display 1413, a keypad 1414, a subscriber identification module (SIM) card 1415, a memory 1420 (i.e., memory 212), a transceiver 1430 (i.e., transceiver 213), one or more antennas 1431, a speaker 1440, and a microphone 1441.

The processor 1410 may be configured to implement proposed functions, procedures and/or methods described in this description. Layers of the radio interface protocol may be implemented in the processor 1410. The processor 1410 may include application-specific integrated circuit (ASIC), other chipset, logic circuit and/or data processing device. The processor 1410 may be an application processor (AP). The processor 1410 may include at least one of a digital signal processor (DSP), a central processing unit (CPU), a graphics processing unit (GPU), a modem (modulator and demodulator), An example of the processor 1410 may be found in SNAPDRAGON™ series of processors made by Qualcomm®, EXYNOS™ series of processors made by Samsung®, A series of processors made by Apple®, HELIUM™ series of processors made by MediaTek®, ATOM™ series of processors made by Intel® or a corresponding next generation processor.

The processor 1410 may be configured to, or configured to control the transceiver 1430 to implement steps performed by the UE, and/or the wireless device throughout the disclosure.

The power management module 1411 manages power for the processor 1410 and/or the transceiver 1430. The battery 1412 supplies power to the power management module 1411. The display 1413 outputs results processed by the processor 1410. The keypad 1414 receives inputs to be used by the processor 1410. The keypad 1414 may be shown on the display 1413. The SIM card 1415 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1420 is operatively coupled with the processor 1410 and stores a variety of information to operate the processor 1410. The memory 1420 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1420 and executed by the processor 1410. The memory 1420 can be implemented within the processor 1410 or external to the processor 1410 in which case those can be communicatively coupled to the processor 1410 via various means as is known in the art.

The transceiver 1430 is operatively coupled with the processor 1410, and transmits and/or receives a radio signal. The transceiver 1430 includes a transmitter and a receiver. The transceiver 1430 may include baseband circuitry to process radio frequency signals. The transceiver 1430 controls the one or more antennas 1431 to transmit and/or receive a radio signal.

The speaker 1440 outputs sound-related results processed by the processor 1410. The microphone 1441 receives sound-related inputs to be used by the processor 1410.

According to various embodiments, the processor 1410 may be configured to, or configured to control the transceiver 1430 to implement steps performed by the UE and/or the wireless device throughout the disclosure. For example, the processor 1410 may be configured to control the transceiver 1430 to receive a configuration for MCG and a configuration for SCG. The processor 1410 may be configured to apply a first TA for one or more cells in the SCG and skipping a PDCCH monitoring for the one or more cells in a first state while a TA timer is running. The TA timer may be started upon receiving a TA command including the first TA. The processor 1410 may be configured to perform a state switching to a second state from the first state at a time point determined based on information received from a network. In the second state, a PDCCH monitoring is performed for the one or more cells may be performed. The processor 1410 may be configured to control the transceiver 1430 to transmit, to the network, switching information informing the state switching. The processor 1410 may be configured to control the transceiver 1430 to receive, in the second state, a TA command including a second TA upon which the TA timer is restarted, after transmitting the switching information. The processor 1410 may be configured to apply the second TA for the one or more cells while the restarted TA timer is running.

Figure 15:
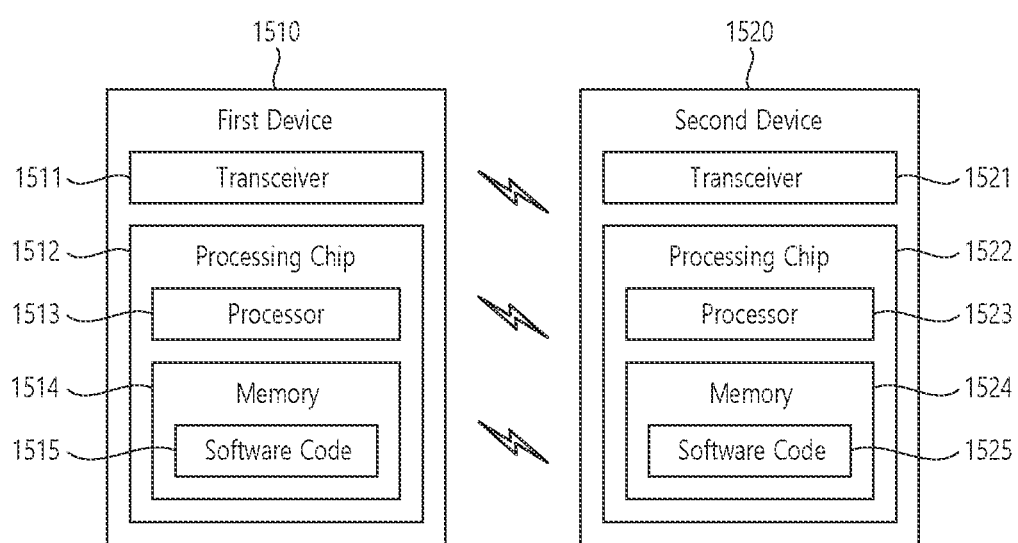
FIG. 15 shows another example of a wireless communication system to which the technical features of the present disclosure can be applied.

FIG. 15 shows another example of a wireless communication system to which the technical features of the present disclosure can be applied.

Referring to FIG. 15, the wireless communication system may include a first device 1510 (i.e., first device 210) and a second device 1520 (i.e., second device 220).

The first device 1510 may include at least one transceiver, such as a transceiver 1511, and at least one processing chip, such as a processing chip 1512. The processing chip 1512 may include at least one processor, such a processor 1513, and at least one memory, such as a memory 1514. The memory may be operably connectable to the processor 1513. The memory 1514 may store various types of information and/or instructions. The memory 1514 may store a software code 1515 which implements instructions that, when executed by the processor 1513, perform operations of the first device 910 described throughout the disclosure. For example, the software code 1515 may implement instructions that, when executed by the processor 1513, perform the functions, procedures, and/or methods of the first device 1510 described throughout the disclosure. For example, the software code 1515 may control the processor 1513 to perform one or more protocols. For example, the software code 1515 may control the processor 1513 to perform one or more layers of the radio interface protocol.

The second device 1520 may include at least one transceiver, such as a transceiver 1521, and at least one processing chip, such as a processing chip 1522. The processing chip 1522 may include at least one processor, such a processor 1523, and at least one memory, such as a memory 1524. The memory may be operably connectable to the processor 1523. The memory 1524 may store various types of information and/or instructions. The memory 1524 may store a software code 1525 which implements instructions that, when executed by the processor 1523, perform operations of the second device 1520 described throughout the disclosure. For example, the software code 1525 may implement instructions that, when executed by the processor 1523, perform the functions, procedures, and/or methods of the second device 1520 described throughout the disclosure. For example, the software code 1525 may control the processor 1523 to perform one or more protocols. For example, the software code 1525 may control the processor 1523 to perform one or more layers of the radio interface protocol.

According to various embodiments, the first device 1510 as illustrated in FIG. 15 may comprise a wireless device. The wireless device may comprise a transceiver 1511, a processing chip 1512. The processing chip 1512 may comprise a processor 1513, and a memory 1514. The memory 1514 may be operably connectable to the processor 1513. The memory 1514 may store various types of information and/or instructions. The memory 1514 may store a software code 1515 which implements instructions that, when executed by the processor 1513, perform operations comprising: receiving a configuration for a master cell group (MCG) and a configuration for a secondary cell group (SCG); applying a first timing alignment (TA) for one or more cells in the SCG and skipping a physical downlink control channel (PDCCH) monitoring for the one or more cells in a first state while a TA timer is running, wherein the TA timer is started upon receiving a TA command including the first TA; performing a state switching to a second state from the first state at a time point determined based on information related to state switching time received from a network, wherein a PDCCH monitoring is performed for the one or more cells in the second state, transmitting, to the network, switching information informing the state switching; receiving, in the second state, a TA command including a second TA upon which the TA timer is restarted, after transmitting the switching information; and applying the second TA for the one or more cells while the restarted TA timer is running.

According to various embodiments, a non-transitory computer-readable medium may have stored thereon a plurality of instructions. The plurality of instructions, when executed by a processor of a wireless device, may cause the wireless device to: receive a configuration for a master cell group (MCG) and a configuration for a secondary cell group (SCG); apply a first timing alignment (TA) for one or more cells in the SCG and skipping a physical downlink control channel (PDCCH) monitoring for the one or more cells in a first state while a TA timer is running, wherein the TA timer is started upon receiving a TA command including the first TA; perform a state switching to a second state from the first state at a time point determined based on information related to state switching time received from a network, wherein a PDCCH monitoring is performed for the one or more cells in the second state; transmit, to the network, switching information informing the state switching; receive, in the second state, a TA command including a second TA upon which the TA timer is restarted, after transmitting the switching information; and apply the second TA for the one or more cells while the restarted TA timer is running.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers, Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini hatch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the teaming method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 16:
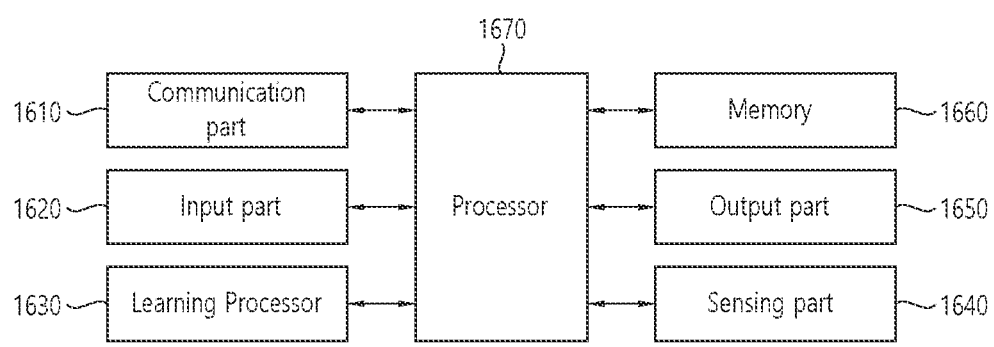
FIG. 16 shows an example of an AI device to which the technical features of the present disclosure can be applied.

FIG. 16 shows an example of an AI device to which the technical features of the present disclosure can be applied.

The AI device 1600 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 16, the AI device 1600 may include a communication part 1610, an input part 1670, a learning processor 1630, a sensing part 1640, an output part 1650, a memory 1660, and a processor 1670.

The communication park 1610 can transmit and/or receive data to and/or from external devices such as the AI devices and the AI server using wire and/or wireless communication technology. For example, the communication part 1610 can transmit and/or receive sensor information, a user input, a learning model, and a control signal with external devices. The communication technology used by the communication part 1610 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA). ZigBee, and/or near field communication (NFC).

The input part 1670 can acquire various kinds of data. The input part 1670 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1670 can acquire input data to be used when acquiring an output using learning data and a learning model for model learning. The input part 1670 may obtain raw input data, in which case the processor 1670 or the learning processor 1630 may extract input features by preprocessing the input data.

The learning processor 1630 may learn a model composed of an ANN using learning data. The learned ANN can be referred to as a learning model. The learning model can be used to infer result values for new input data rather than learning data, and the inferred values can be used as a basis for determining which actions to perform. The learning processor 1630 may perform AI processing together with the learning processor of the AI server. The learning processor 1630 may include a memory integrated and/or implemented in the AI device 1600. Alternatively, the learning processor 1630 may be implemented using the memory 1660, an external memory directly coupled to the AI device 1600, and/or a memory maintained in an external device.

The sensing part 1640 may acquire at least one of internal information of the AI device 1600, environment information of the AI device 1600, and/or the user information using various sensors. The sensors included in the sensing part 1640 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1650 may generate an output related to visual, auditory, tactile, etc. The output part 1650 may include a display unit for outputting visual information, a speaker for outputting auditory information, and/or a haptic module for outputting tactile information.

The memory 1660 may store data that supports various functions of the AI device 1600. For example, the memory 1660 may store input data acquired by the input part 1670, learning data, a learning model, a learning history, etc.

The processor 1670 may determine at least one executable operation of the AI device 1600 based on information determined and/or generated using a data analysis algorithm and/or a machine learning algorithm. The processor 1670 may then control the components of the AI device 1600 to perform the determined operation. The processor 1670 may request, retrieve, receive, and/or utilize data in the learning processor 1630 and/or the memory 1660, and may control the components of the AI device 1600 to execute the predicted operation and/or the operation determined to be desirable among the at least one executable operation. The processor 1670 may generate a control signal for controlling the external device, and may transmit the generated control signal to the external device, when the external device needs to be linked to perform the determined operation. The processor 1670 may obtain the intention information for the user input and determine the user's requirements based on the obtained intention information. The processor 1670 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the SIT engine and/or the NLP engine may be learned by the learning processor 1630 and/or learned by the learning processor of the AI server, and/or learned by their distributed processing. The processor 1670 may collect history information including the operation contents of the AI device 1600 and/or the user's feedback on the operation, etc. The processor 1670 may store the collected history information in the memory 1660 and/or the learning processor 1630, and/or transmit to an external device such as the AI server. The collected history information can be used to update the learning model. The processor 1670 may control at least some of the components of AI device 1600 to drive an application program stored in memory 1660. Furthermore, the processor 1670 may operate two or more of the components included in the AI device 1600 in combination with each other for driving the application program.

Figure 17:
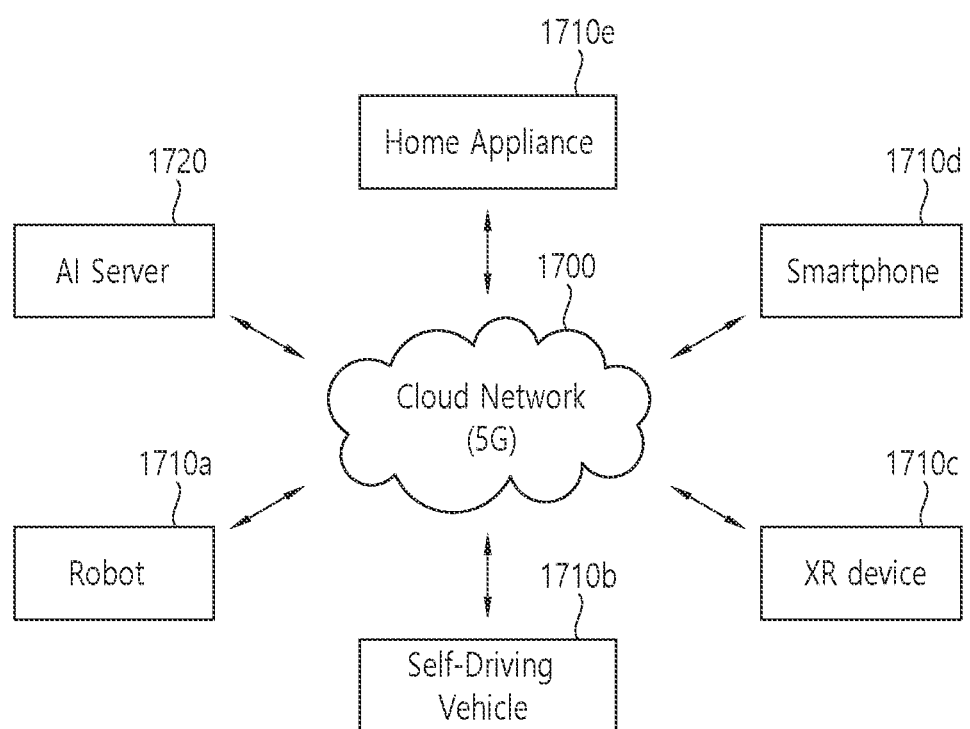
FIG. 17 shows an example of an AI system to which the technical features of the present disclosure can be applied.

FIG. 17 shows an example of an AI system to which the technical features of the present disclosure can be applied.

Referring to FIG. 17, in the AI system, at least one of an AI server 1720, a robot 1710a, an autonomous vehicle 1710b, an XR device 1710c, a smartphone 1710d and/or a home appliance 1710e is connected to a cloud network 1700. The robot 1710a, the autonomous vehicle 1710b, the XR device 1710c, the smartphone 1710d, and/or the home appliance 1710e to which the AI technology is applied may be referred to as AI devices 1710a to 1710e.

The cloud network 1700 may refer to a network that forms part of a cloud computing infrastructure and/or resides in a cloud computing infrastructure. The cloud network 1700 may be configured using a 3G network, a 4G or LTE network, and/or a 5G network. That is, each of the devices 1710a to 1710e and 1720 consisting the AI system may be connected to each other through the cloud network 1700. In particular, each of the devices 1710a to 1710e and 1720 may communicate with each other through a base station, but may directly communicate with each other without using a base station.

The AI server 1720 may include a server fir performing AI processing and a server for performing operations on big data. The AI server 1720 is connected to at least one or more of AI devices constituting the AI system, i.e. the robot 1710a, the autonomous vehicle 1710b, the XR device 1710c, the smartphone 1710d and/or the home appliance 1710e through the cloud network 1700, and may assist at least some AI processing of the connected AI devices 1710a to 1710e. The AI server 1720 can learn the ANN according to the machine learning algorithm on behalf of the AI devices 1710a to 1710e, and can directly store the learning models and/or transmit them to the AI devices 1710a to 1710e. The AI server 1720 may receive the input data from the AI devices 1710a to 1710e, infer the result value with respect to the received input data using the learning model, generate a response and/or a control command based on the inferred result value, and transmit the generated data to the AI devices 1710a to 1710e. Alternatively, the AI devices 1710a to 1710e may directly infer a result value for the input data using a learning model, and generate a response and/or a control command based on the inferred result value.

Various embodiments of the AI devices 1710a to 1710e to which the technical features of the present disclosure can be applied will be described. The AI devices 1710a to 1710e shown in FIG. 17 can be seen as specific embodiments of the AI device 1600 shown in FIG. 16.

The present disclosure can have various advantageous effects.

For example, an unnecessary RRC signalling for a cell group activation/deactivation. (e.g., SCG activation/deactivation) can be reduced and PUCCH release due to a TA expiry can be prevented while PSCell or PUCCH SCells are suspended in a dormant state.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
   entering a first state for one or more serving cells,
   wherein the first state is a state in which the wireless device skips monitoring a control channel for the one or more serving cells;
   applying a first timing advance value for the one or more serving cells in the first state while a time alignment timer is running,
   wherein the time alignment timer is related to a duration during which the one or more serving cells are considered to be uplink time aligned, and
   wherein the time alignment timer is started upon the wireless device receiving a timing advance command including the first timing advance value;
   performing a state switching to a second state from the first state at a state switching time which is before an expiry time of the time alignment timer, based on information for the state switching time received from a network,
   wherein second state is a state in which the wireless device monitors a control channel for the one or more serving cells;
   transmitting, to the network in the second state, switching information informing the state switching;
   receiving, from the network in the second state, a timing advance command including a second timing advance value upon which the time alignment timer is restarted, after transmitting the switching information; and
   applying the second timing advance value for the one or more serving cells while the restarted time alignment timer is running.

2. The method of claim 1, wherein the one or more serving cells include at least one of a primary secondary cell (PSCell) or a physical uplink control channel (PUCCH) secondary cell (SCell).

3. The method of claim 1, wherein the one or more serving cells are included in a secondary cell group (SCG),
   wherein the SCG is deactivated for the one or more serving cells in the first state, and
   wherein the SCG is activated for the one or more serving cells in the second state.

4. The method of claim 1, wherein a periodic channel status information (CSI) reporting is skipped in the first state, and
   wherein a periodic CSI reporting is performed in the second state.

5. The method of claim 1, wherein the wireless device stays on a dormant bandwidth part (BWP) for the one or more serving cells in the first state, and
   wherein the wireless device stays on a PDCCH-configured BWP for the one or more serving cells in the second state.

6. The method of claim 5, further comprising:
   receiving, from the network, a dormant BWP configuration comprising information informing the dormant BWP.

7. The method of claim 5, wherein the dormant BWP comprises at least one of:
   a BWP informed by a BWP indicator in downlink control information (DCI) received from the network;
   a default BWP to be switched to upon an expiry of a BWP inactivity timer;
   a BWP configured to the wireless device via an RRC signalling from the network; or
   a BWP determined by a media access control (MAC) entity upon an initiation of a random access procedure.

8. The method of claim 5, wherein the PDCCH-configured BWP comprises at least one of:
   an initial BWP used for initial access before radio resource control (RRC) connection is established;
   a default BWP to be switched to upon an expiry of a BWP inactivity timer;
   a BWP selected by the wireless device; or
   a predetermined BWP configured to the wireless device via an RRC signalling from the network.

9. The method of claim 1, wherein the information for the state switching time comprises an offset value which is non-negative value, and
   wherein the state switching time is determined as the expiry time of the time alignment timer minus the offset value.

10. The method of claim 1, wherein the information for the state switching time comprises information for a switching timer value,
    wherein a switching timer is started to run during the switching timer value upon the wireless device receiving the information for the state switching time, and
    wherein the state switching time is an expiry time of the switching timer.

11. The method of claim 1, further comprising:
    after restarting the time alignment timer and applying the second timing advance value for the one or more serving cells, performing a state switching to the first state from the second state.

12. The method of claim 1, wherein the wireless device is in communication with at least one of a user equipment, a network, or autonomous vehicles other than the wireless device.

13. A wireless device in a wireless communication system comprising:
    a transceiver;
    a memory; and
    at least one processor operatively coupled to the transceiver and the memory,
    wherein the memory stores instructions that, based on being executed by the at least one processor, perform operations comprising:
    entering a first state for one or more serving cells,
    wherein the first state is a state in which the wireless device skips monitoring a control channel for the one or more serving cells;
    applying a first timing advance value for the one or more serving cells in the first state while a time alignment timer is running,
    wherein the time alignment timer is related to a duration during which the one or more serving cells are considered to be uplink time aligned, and
    wherein the time alignment timer is started upon the wireless device receiving a timing advance command including the first timing advance value;

performing a state switching to a second state from the first state at a state switching time which is before an expiry time of the time alignment timer, based on information for the state switching time received from a network, wherein the second state is a state in which the wireless device monitors a control channel for the one or more serving cells;

transmitting, to the network in the second state, switching information informing the state switching;

receiving, from the network in the second state, a timing advance command including a second timing advance value upon which the time alignment timer is restarted, after transmitting the switching information; and applying the second timing advance value for the one or more serving cells while the restarted time alignment timer is running.

* * * * *